(12) United States Patent
Shi et al.

(10) Patent No.: US 11,243,309 B2
(45) Date of Patent: Feb. 8, 2022

(54) RANGING SYSTEM AND RANGING METHOD

(71) Applicant: NORTHWEST INSTRUMENT INC., Dover, NJ (US)

(72) Inventors: Xin Shi, Shanghai (CN); David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 226 days.

(21) Appl. No.: 16/656,276

(22) Filed: Oct. 17, 2019

(65) Prior Publication Data

US 2020/0049826 A1    Feb. 13, 2020

Related U.S. Application Data

(63) Continuation-in-part of application No. 15/503,222, filed as application No. PCT/CN2015/074461 on
(Continued)

(30) Foreign Application Priority Data

Feb. 16, 2015   (CN) .......................... 201510084983.6
Jan. 7, 2016    (CN) .......................... 201610008470.1

(51) Int. Cl.
  *G06T 11/20*   (2006.01)
  *G01S 17/89*   (2020.01)
  (Continued)

(52) U.S. Cl.
  CPC ............ *G01S 17/89* (2013.01); *G01C 15/002* (2013.01); *G01S 17/86* (2020.01); *G06F 3/14* (2013.01); *G06T 11/206* (2013.01)

(58) Field of Classification Search
  None
  See application file for complete search history.

(56) References Cited

U.S. PATENT DOCUMENTS 6,532,672 B1    3/2003  Gottlieb
2003/0037448 A1 2/2003  Saksa
(Continued)

FOREIGN PATENT DOCUMENTS

CN    2529198 Y    1/2003
CN   101350153 A   1/2009
(Continued)

OTHER PUBLICATIONS

Klose et al., DE 19508264, Feb. 1, 1996 (machine translation) (Year: 1996).*

(Continued)

*Primary Examiner* — Yi Wang
(74) *Attorney, Agent, or Firm* — Anova Law Group, PLLC

(57) ABSTRACT

A ranging system includes a terminal device, a ranging apparatus, and an angle sensor disposed in the terminal device or in the ranging apparatus. The ranging apparatus includes a measuring wheel, a rotating shaft disposed on the measuring wheel, and an electronic counter connected to the rotating shaft and configured to obtain distance information, in real time, of a route which the measuring wheel has already traveled. The angle sensor is configured to obtain angle information in real time. The terminal device and the ranging apparatus are configured to transmit data between each other. The terminal device is configured to generate a traveling trajectory diagram of the measuring wheel, in real time, based on the distance information from the electronic counter and the angle information from the angle sensor, and perform optimization processing on the traveling trajectory to generate an optimized trajectory diagram.

20 Claims, 11 Drawing Sheets

Related U.S. Application Data

Mar. 18, 2015, now Pat. No. 10,473,473, application No. 16/656,276, which is a continuation-in-part of application No. 15/547,939, filed as application No. PCT/CN2016/070454 on Jan. 8, 2016, now Pat. No. 11,069,100.

(51) Int. Cl.
*G06F 3/14* (2006.01)
*G01C 15/00* (2006.01)
*G01S 17/86* (2020.01)

(56) References Cited

U.S. PATENT DOCUMENTS

| | | | |
|---|---|---|---|
| 2005/0219517 A1 | 10/2005 | Tanaka et al. | |
| 2006/0070250 A1 | 4/2006 | Siraky et al. | |
| 2007/0179645 A1 | 8/2007 | Nixon et al. | |
| 2009/0210071 A1 | 8/2009 | Agrusa et al. | |
| 2009/0217542 A1 | 9/2009 | Watkins | |
| 2012/0195491 A1 | 8/2012 | Zhang et al. | |
| 2012/0319895 A1 | 12/2012 | Bruchiel | |
| 2014/0063510 A1 | 3/2014 | Seifert | |
| 2014/0081659 A1* | 3/2014 | Nawana | G16H 40/63 705/3 |
| 2014/0267717 A1 | 9/2014 | Pitzer et al. | |
| 2014/0317944 A1 | 10/2014 | Kumagai et al. | |
| 2015/0123995 A1 | 5/2015 | Zavodny et al. | |
| 2015/0205283 A1* | 7/2015 | Brand | G05B 19/40937 700/186 |
| 2016/0005229 A1 | 1/2016 | Lee et al. | |
| 2016/0205123 A1 | 7/2016 | Almurayh | |
| 2017/0024917 A1 | 1/2017 | Deitrich | |
| 2017/0082414 A1 | 3/2017 | Thorp et al. | |
| 2017/0108236 A1 | 4/2017 | Guan et al. | |
| 2018/0075643 A1 | 3/2018 | Sequeira et al. | |

FOREIGN PATENT DOCUMENTS

| | | |
|---|---|---|
| CN | 102236030 A | 11/2011 |
| CN | 102506683 A | 6/2012 |
| CN | 103234445 A | 8/2013 |
| CN | 103777204 A | 5/2014 |
| CN | 104111050 A | 10/2014 |
| CN | 104501803 A | 4/2015 |
| CN | 104634222 A | 5/2015 |
| CN | 204514232 U | 7/2015 |
| DE | 4318939 A1 | 12/1994 |
| DE | 19508264 C1 | 2/1996 |
| DE | 19536597 A1 | 3/1997 |
| EP | 2796832 A1 | 10/2014 |
| EP | 2824525 A1 | 1/2015 |
| GB | 2513238 A | 10/2014 |
| WO | 0175392 A2 | 10/2001 |
| WO | 2014103989 A1 | 7/2014 |

OTHER PUBLICATIONS

Klose et al., DE 19508264, Feb. 1, 1996 (machine translation).
Office Action for Chinese Application No. 201510084983.6, dated May 2, 2018.
Office Action for Chinese Application No. 2016122901860540, dated Jan. 4, 2017.
World Intellectual Property Organization (WIPO) International Search Report for PCT/CN2015/074461 dated Nov. 10, 2015 2 pages.
World Intellectual Property Organization (WIPO) International Search Report for PCT/CN2016/070454 dated Oct. 11, 2016 2 pages.

* cited by examiner before optimization after optimization

RANGING SYSTEM AND RANGING METHOD

CROSS-REFERENCE TO RELATED APPLICATION

This present application is a continuation-in-part application of U.S. patent application Ser. No. 15/503,222, filed on Sep. 11, 2017, which is a national-stage entry of International Patent Application PCT/CN2015/074461, filed on Mar. 18, 2015, which claims priority to Chinese Patent Application 201510084983.6, filed on Feb. 16, 2015. The present application further claims priority to U.S. patent application Ser. No. 15/547,939, filed on Aug. 1, 2017, which is a national-stage entry of International Patent Application PCT/CN2016/070454, filed on Jan. 8, 2016, which claims priority to Chinese Patent Application 201610008470.1, filed on Jan. 7, 2016. The entire contents of all above referred patent applications are incorporated herein by reference.

TECHNICAL FIELD

The present disclosure relates to the field of surveying and mapping, and more particularly, to a ranging system and a ranging method.

BACKGROUND

Currently, people to use ranging devices to measure and plan routes and the area in all aspects of life and work, such as in the field of construction, road engineering, transportation, pipeline laying, landscape areas etc. The most commonly used ranging device is a measuring wheel.

The basic principle of a measuring wheel is to calculate a number of rotations based on the rolling of the measuring wheel and with the help of mechanical gear counter or electronic counter, so as to realize distance measurement. A typical measuring wheel only measures a length of a traveling trajectory between two points. Afterwards, drawings need to be created segment by one segment. Thus, this method may be very time consuming and the measurement accuracy may be very low. Therefore, only limited function may be achieved in applications.

SUMMARY

In one aspect of the present disclosure, a ranging system is provided. The ranging system includes a terminal device, a ranging apparatus, and an angle sensor disposed in the terminal device or in the ranging apparatus. The ranging apparatus includes a measuring wheel, a rotating shaft disposed on the measuring wheel, and an electronic counter connected to the rotating shaft and configured to obtain distance information, in real time, of a route which the measuring wheel has already traveled. The angle sensor is configured to obtain angle information in real time. The terminal device and the ranging apparatus are configured to transmit data between each other. The terminal device is configured to generate a traveling trajectory diagram of the measuring wheel, in real time, based on the distance information from the electronic counter and the angle information from the angle sensor, and perform optimization processing on the traveling trajectory to generate an optimized trajectory diagram.

In certain embodiments, the terminal device is further configured to compare a current traveling trajectory of the measuring wheel, in real time, with a predesigned traveling trajectory diagram stored on the terminal device, and output deviation data in response to the current traveling trajectory of the measuring wheel deviating from the predesigned traveling trajectory diagram.

In certain embodiments, the terminal device comprises a storage device configured to store the predesigned traveling trajectory diagram; and the terminal device is further configured to perform direction and/or distance prompt based on the deviation data to indicate a user to correct the current traveling trajectory of the measuring wheel.

In certain embodiments, the ranging apparatus further comprises a marker configured to mark on the route of the measuring wheel according to a user instruction or according to a preconfigured rule.

In certain embodiments, the angle sensor is an electronic compass disposed in the ranging apparatus and configured to communicate with the terminal device.

In certain embodiments, the angle sensor is a gyroscope disposed in the terminal device.

In certain embodiments, the ranging apparatus further comprises a holder for fixing the terminal device.

In certain embodiments, the terminal device further comprises a camera configured to obtain, in real time, a scene image in a traveling direction of the measuring wheel; and the terminal device is further configured to display the scene image and provide direction and/or distance prompt on the scene image.

In certain embodiments, the terminal device and the ranging apparatus are configured to transmit data between each other through one of: a wireless communication channel using a Bluetooth, a WIFI, a Zigbee or an RF communication protocol; or a wired communication channel using an RS232, an RS485, an I2C, an SPI or a CAN protocol.

In certain embodiments, the ranging system further comprises a cloud server communicating with the terminal device, the cloud server being configured to store and share data sent by the terminal device. The data sent by the terminal device includes at least one of: the distance information from the electronic counter, the angle information from the angle sensor, and a first traveling trajectory diagram. The terminal device is configured to retrieve the predesigned traveling trajectory diagram from the cloud server.

In certain embodiments, the terminal device is further configured to: in response to the traveling trajectory diagram containing a closed trajectory, calculate an area of the closed trajectory by meshing the closed trajectory and calculating the area of meshes contained by the closed trajectory.

In certain embodiments, the terminal device is one of: a smart cellphone, a computer, or a handheld equipment.

In certain embodiments, the terminal device is configured to: generate the current trajectory diagram by connecting a plurality of sampling points, each sampling point being define by a distance value and an angle value obtained from the electronic counter and the angle sensor; and generate the optimized trajectory diagram by processing the plurality of sampling points.

In certain embodiments, the terminal device is configured to generate the optimized trajectory diagram by: dividing the plurality of sampling points into a plurality of sampling point groups, each sampling point group including a pre-configured number of sampling points; and for each sampling point group, calculating a variance among the angle values of the pre-configured number of sampling points, and removing a stray value from the angle value of each sampling point in the sampling point group.

In certain embodiments, the terminal device is configured to generate the optimized trajectory diagram by: analyzing a change in the angle values between a first sampling point and a second sampling point being adjacent to the first sampling point; in response to the change in the angle values being below a pre-configured threshold angle, adjusting the angle value of the second sampling point to the angle value of the first sampling point; and in response to the change in the angle values being within a pre-configured range about an integer multiples of 45°, adjusting the angle value of the second sampling point so that the change in the angle values is rounded to the integer multiples of 45°.

In certain embodiments, the ranging system further comprises a gravity accelerometer configured to measure a tilt angle; and the terminal device is further configured to calculate a height at a sampling point according to the measured tilt angle and distance information.

In another aspect of the present disclosure, a ranging method is provided. The ranging method includes: obtaining, by an electronic counter, in real time, distance information which a measuring wheel of a ranging device has already traveled; obtaining, by an angle sensor, in real time, angle information of the measuring wheel, when the measuring wheel is traveling; transmitting the distance information and the angle information to a terminal device; processing the distance information and the angle information into trajectory data by the terminal device; generating, by the terminal device, in real time, a traveling trajectory diagram of the measuring wheel according to the trajectory data; and performing optimization processing on the traveling trajectory to generate an optimized trajectory diagram.

In certain embodiments, the ranging method further includes: comparing a current traveling trajectory of the measuring wheel, in real time, with a predesigned traveling trajectory diagram stored on the terminal device; and outputting deviation data in response to the current traveling trajectory of the measuring wheel deviating from the predesigned traveling trajectory diagram.

In certain embodiments, the ranging method further includes: storing the predesigned traveling trajectory diagram in the terminal device; and prompting direction and/or distance based on the deviation data to indicate the user to correct the current traveling route of the measuring wheel.

In certain embodiments, the ranging method further includes: marking, by a maker disposed in the ranging device, on a traveling route of the measuring wheel according to a user instruction or according to a preconfigured rule.

The above aspects will be made clear by the following detailed description and accompanying drawings.

BRIEF DESCRIPTION OF THE DRAWINGS

In order to more clearly illustrate the technical solutions in the embodiments of the present disclosure, the drawings used in the description of the embodiments will be briefly described below. The drawings in the following description are only some embodiments of the present disclosure. Other drawings may be obtained by those of ordinary skill in the art based on these drawings.

FIG. 10 illustrates displaying a trajectory diagram based on ranging measurements over a real-scene photo in.

DETAILED DESCRIPTION

The technical solutions according to the embodiments of the present disclosure is described in the following with reference to the accompanying drawings. The implementation manners described in the following exemplary embodiments do not represent all embodiments of the present disclosure. Instead, they are merely examples of devices and methods consistent with aspects provided by the present disclosure as detailed in the claims. All other embodiments obtained by a person of ordinary skill in the art based on the embodiments of the present disclosure without creative efforts are within the scope of the present disclosure.

In the present disclosure, relational terms such as "first" and "second" are used merely to distinguish one entity or operation from another entity or operation, and do not necessarily require or imply actual relationship or order between these entities or operations. The terms "comprise", "include", or any other variations intended to cover a non-exclusive inclusion, such that a process, method, article, or device that having a plurality of elements, include not only those elements but also other items not specifically listed elements, or elements that are inherent to such a process, method, item, or device. Unless otherwise limited, an element that is defined by the phrase "comprising a . . . " does not exclude the presence of additional equivalent elements in the process, method, item, or device that comprises the element.

Figure 1:
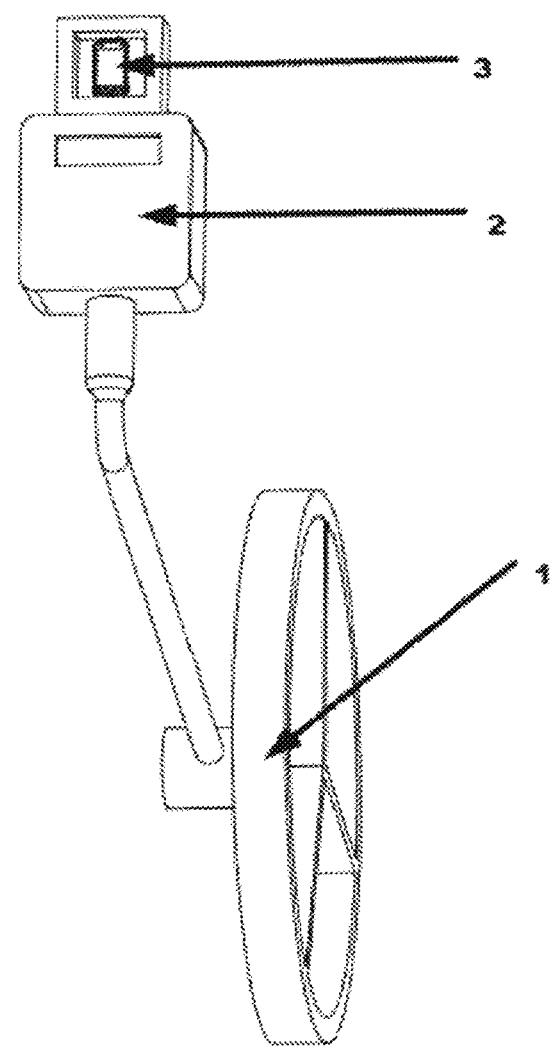
FIG. 1 is a schematic structural view of a ranging system according to an embodiment of the present disclosure.
Figure 2:
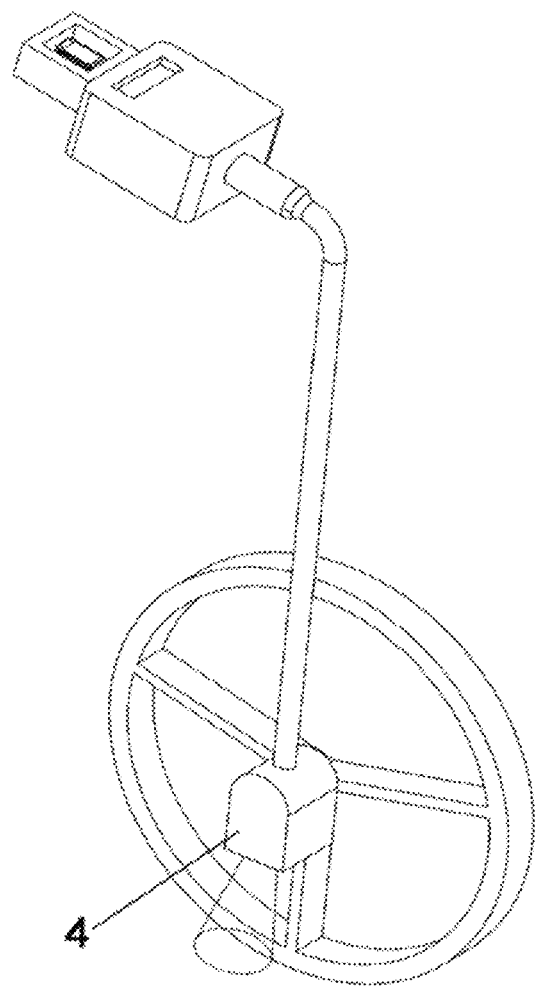
FIG. 2 is a schematic structural view of a ranging system according to another embodiment of the present disclosure.

FIG. 1 is a schematic structural view of a ranging system according to an embodiment of the present disclosure and FIG. 2 is a schematic structural view of a ranging system according to another embodiment of the present disclosure. As shown in FIG. 1, according to certain embodiments, the ranging system may include a ranging apparatus and a terminal device 3. The terminal device 3 may have a processor. The ranging apparatus may include a measuring wheel 1, a rotating shaft disposed on the measuring wheel 1, and an electronic counter connected to the rotating shaft and used to obtain distance information of the measuring wheel. A data processing unit is provided on the terminal device 3. The data processing unit may be implemented by the processor. Communication modules may be arranged both on both the terminal device and the ranging apparatus so that the terminal device and the ranging apparatus may exchange data. In certain embodiments, the ranging apparatus may be equipped with an angle sensor. In certain other embodiments, the angle sensor may be arranged on the terminal device. For example, in certain embodiments of the present disclosure, the angle sensor may be an electronic compass disposed in the ranging apparatus and connected to the communication module of the ranging apparatus. In certain other embodiments the angle sensor may be a gyroscope disposed in the terminal device and connected to the communication module.

Through this communication modules, the terminal device 3 may receive distance information from the electronic counter. The terminal device may further receive angle information from the angle sensor. The data processing unit may perform calculation based on the distance information and the angle information to create, in real time, a traveling trajectory diagram that illustrates a trajectory the measuring wheel has traveled. The terminal device may display the traveling trajectory diagram on a display screen of the terminal device.

The present disclosure combines the application of an electronic counter and an angle sensor to generate a drawing of the traveling trajectory, in real time, on the terminal device by using the data measured by the ranging apparatus. This approach does not only achieve distance measurement, but also generates the diagram of the traveling trajectory in real time. There is no need to perform ranging segment by segment, and create the trajectory diagram in a post-processing step. Thus, work efficiency of the ranging system is effectively improved.

In certain embodiments of the present disclosure, the ranging system may also be used to mark lines or points in a real physical scene, such as on a field or in a construction site. For example, the ranging system may include one or more markers. The marker may be connected to the rotating shaft so that the user may activate the markers to mark points or lines on the traveling route of the measuring wheel on a field or a contraction site. The activation of the markers may be performed by the terminal device.

In certain embodiments, a predesigned traveling trajectory diagram may be stored in a storage medium of the terminal device. While the terminal device is in the process of generating a current traveling trajectory based on the distance information and the angle information, it may compare current traveling trajectory with the predesigned traveling trajectory diagram in real time, and thus monitoring whether the current traveling trajectory deviates from the predesigned traveling trajectory in real time. The terminal device may also output the deviation between the current traveling trajectory and the predesigned traveling trajectory diagram as deviation data when the current traveling trajectory of the measuring wheel deviates from the predesigned traveling trajectory. The deviation data may be, for example, angle and distance data for which the measuring wheel needs to be adjusted from the current location to the predesigned trajectory. The deviation data may also be displayed on a trajectory diagram.

The terminal device may further comprise a prompt module which receives the above deviation data and is configured to perform direction and/or distance prompt based on the deviation data to indicate the user to correct the current traveling route. In certain embodiments, the predesigned traveling trajectory diagram may indicate certain predesigned marking points or marking lines on the diagram. The prompt module may prompt or indicate the user to use a separate marker to mark points or lines on the traveling route of the measuring wheel based on the locations of the predesigned marking points or marking lines on the predesigned traveling trajectory diagram.

In another embodiment of the present disclosure, a marker may be disposed on the ranging apparatus. For example, the marker may be connected to the rotating shaft so that the user may instruct the marker to mark points or lines at the predetermined location when the prompt module prompts that the current location needs to be marked. The data processing unit may compare the current traveling trajectory to the predesigned traveling trajectory diagram, and if the data processing unit determines that the current location needs to be marked according to the comparison, a marking instruction may be sent to the marker via the communication module, so as to mark points or lines for the measuring site automatically. Referring to FIG. 2, in FIG. 2 a schematic diagram illustrating that the marker 4 is connected to the rotating shaft of the ranging apparatus is shown.

In certain embodiments, based on a predesigned trajectory in a predesigned trajectory diagram, marking lines or points on a field or site may be achieved, and direction and distance information can be prompted to the user.

Figure 3:
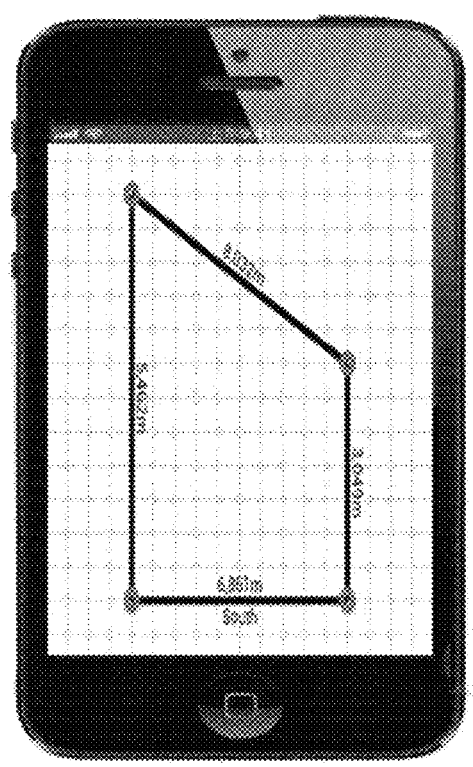
FIG. 3 is a schematic diagram of a regular traveling trajectory diagram generated by a ranging system according to an embodiment of the present disclosure.
Figure 4:
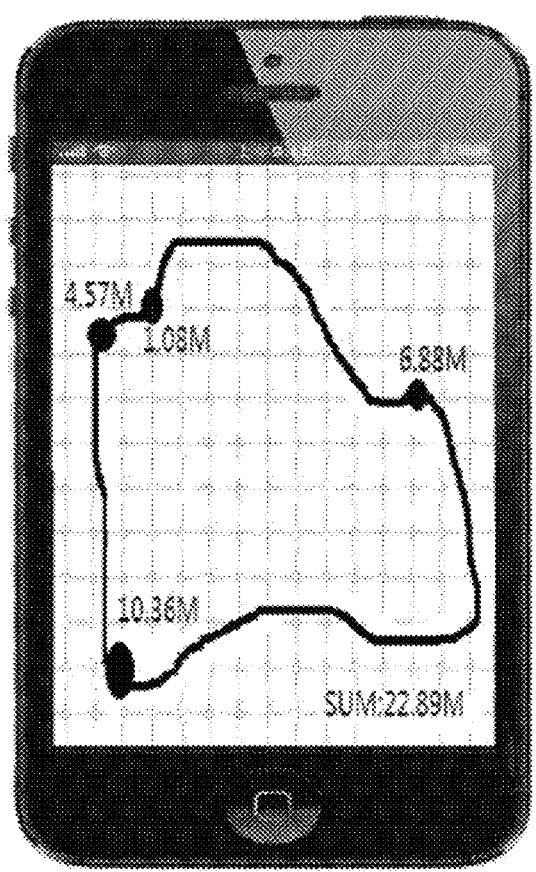
FIG. 4 is a schematic diagram of an irregular and continuous traveling trajectory diagram generated by a ranging system according to an embodiment of the present disclosure.

FIG. 3 shows a regular traveling trajectory diagram generated by a ranging system and displayed on a display screen of the terminal device according to an embodiment of the present disclosure. The regular traveling trajectory diagram may include a plurality of line sections. In certain embodiments, the regular traveling trajectory may be a closed trajectory. FIG. 4 shows an irregular and continuous traveling trajectory diagram generated by a ranging system according to certain embodiments of the present disclosure. The irregular and continuous traveling trajectory may include a continuous curve that may or may not be a closed curve. As shown in FIG. 3 and FIG. 4, the ranging system may continuously measure regular and irregular travel routes and generate the traveling trajectory diagrams in real time.

As shown in FIG. 1 and FIG. 2, a holder for fixing the terminal device 3 and connected to the side end of the electronic counter 2 may be provided in the ranging apparatus. The holder may facilitate the measuring process, maintain a stable signal transmission and avoid the measuring error caused by the angle sensor at the same time. In certain embodiments, the communication modules in the ranging apparatus and the terminal device 3 may be wired communication modules, such as RS 232, RS485, I2C, SPI or CAN. Although FIG. 2 shows that the holder is arranged on the side end of the electronic counter 2, the present disclosure is not limited thereto. The scope of the present disclosure covers all configurations that may stably connect the terminal device 3 to the electronic counter 2.

Although FIG. 1 and FIG. 2 show the configuration in which the terminal device 3 is fixed on the ranging apparatus via the holder, the present disclosure is not limited thereto. Instead, the terminal device does not have to be fixed on the ranging apparatus to obtain distance information and angle information by the way of wireless communication by using the wireless communication module disposed in the ranging apparatus and the terminal device. The wireless communication module may be implemented with Bluetooth, WIFI, Zigbee or RF protocols.

The storage medium in the terminal device according to the present disclosure may be further used to store distance information, angle information and the traveling trajectory diagrams generated by the data processing unit. The stored information may be retrieved later. According to certain embodiments, the terminal device may be a smart cellphone, a tablet, a computer, or a handheld equipment.

Figure 5:
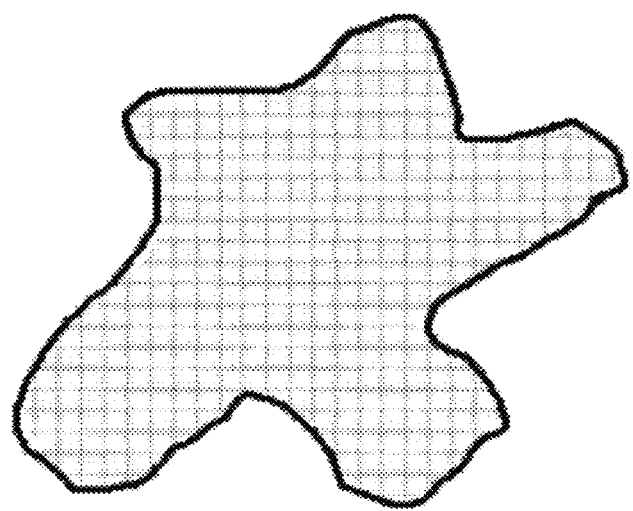
FIG. 5 is a schematic diagram illustrating how the ranging system according to the present disclosure calculates an area of a traveling trajectory by using mesh computing.

As shown in FIG. 5, in certain embodiments of the present disclosure, the terminal device may be configured to calculate an area of a closed trajectory by meshing the closed trajectory and calculating the area of the meshes contained by the closed trajectory, when the generated traveling trajectory diagram is a closed trajectory, so that an area enclosed by the measured trajectory may be obtained. Generally speaking, the smaller the mesh used when meshing the closed graphic is, the higher the computation accuracy is for area of the closed trajectory.

The ranging system according to the present disclosure may further comprise a cloud server. The terminal device and the cloud server may be connected to Internet. The cloud server may be used for storing and sharing the data sent by the terminal device. The data may include: distance information from the electronic counter, angle information from the angle sensor, and/or the generated traveling trajectory diagram. Further, the terminal device may obtain predesigned traveling trajectory diagram from the cloud server. In this manner, the stored data may be retrieved in real time and the testing data or diagram may be shared with other engineering staff to effectively improve the work quality and efficiency. In certain embodiments, the traveling trajectory generated by the terminal device and uploaded to the cloud server may be the predesigned traveling trajectory diagram to be obtained.

In certain embodiments, the terminal device may be further provided with a camera configured to take images of a real scene. The data processing unit may combine the scene image obtained by the camera with the trajectory diagram generated by the ranging system and display them on a display screen. The terminal device may be configured to provide the above-mentioned direction and/or distance prompt on the scene image to indicate the user to correct the traveling route and to indicate the user to mark points or lines for a field or a construction site.

Figure 6:
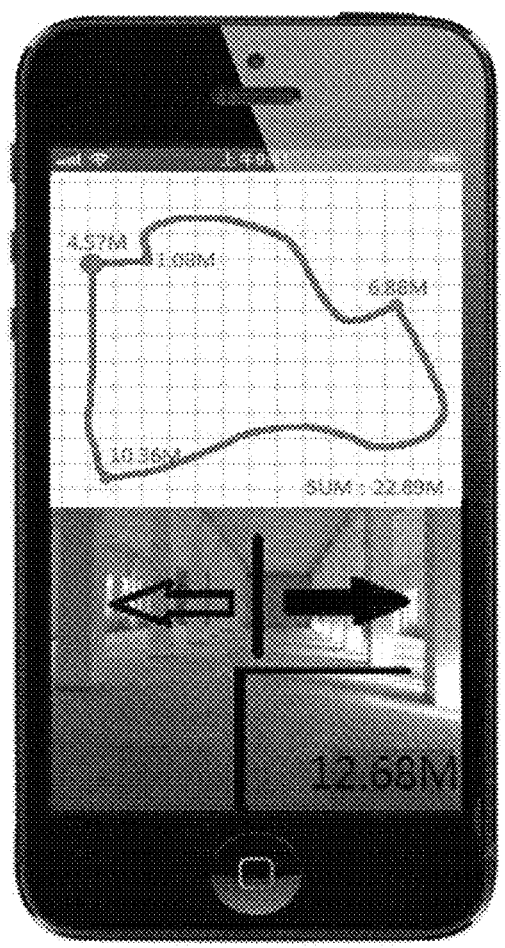
FIG. 6 is a schematic diagram illustrating how the ranging system according to an embodiment of the present disclosure prompts during a traveling process of a measuring wheel.

When the predesigned traveling trajectory diagram stored in the terminal device or the cloud server is retrieved, a staff member may mark on the actual work site using the one or more markers configured on the ranging system based on the predesigned trajectory in the diagram. Referring to FIG. 6, a trajectory is displayed on a first (top) portion of the display screen. On a second (bottom) portion of the display screen, a prompt for direction deviation (shown as arrows), and a prompt for distance deviation (shown in meters) are combined and displayed on top of the scene image. The traveling trajectory diagram herein may be a predesigned traveling trajectory diagram obtained from the cloud server.

In certain embodiments, the data processing unit may generate a trajectory diagram by connecting a plurality of sampling points, each sampling point being define by distance and angle data obtained from the electronic counter and the angle sensor. A starting point of the trajectory diagram may be selected by a user or from a pre-configured position, such as a center point of the display screen.

Figure 7:
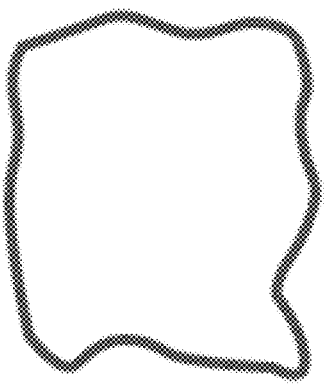
FIG. 7 illustrates an irregular-shaped trajectory generated without optimization, and a regular-shaped trajectory after an optimization processing.
Figure 7:
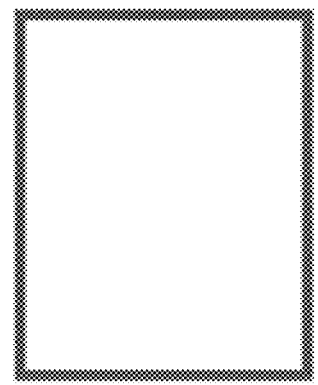

In certain embodiments, during the generation of the trajectory diagram, the data processing unit may perform further processing to optimize the trajectory. For example, the data processor unit may divide plurality of sampling points into a plurality of sampling point groups, each sampling point group including a pre-configured number of sampling points. For each sampling point group, a variance among the angle data of the number of sampling points may be calculated, and a stray value may be calculated according to the calculated variance and removed from the angle data of each sampling point. In certain embodiments, the pre-configured number of sampling points in each sampling point group may be 100. In certain other embodiments, the data processing unit may analyze the difference in the angle data between two adjacent sampling points. If the angle difference between a pair of adjacent sampling points is below a pre-configured threshold angle, the angle value of one of the adjacent may be adjusted so that the angle difference is set to 0°. For example, the pre-configured threshold angle may be within the range of $\pm(1°-30°)$, and thus if the angle difference between the first sampling point and the second sampling point is smaller than the threshold angle, the angle value of the second sampling point may be adjusted to be the same as the angle value of the first sampling point. Thus, small variations in angle data can be smoothed out for the optimized trajectory diagram. Further, in certain embodiments, if the angle difference between a pair of adjacent sampling points is within a pre-configured range about an angle of 45°, 90°, 145°, or 180°, the difference may be re-set to that angle of 45°, 90°, 145°, or 180°. Thus, after the optimization, an irregular-shaped trajectory may be processed in o a regular-shaped trajectory that is closer to a rectangle shape. Referring to FIG. 7, the left diagram shows an irregular-shaped trajectory generated without optimization, and the right diagram shows a regular-shaped trajectory after the optimization processing.

In certain embodiments, in addition to an angle sensor configured on the terminal device, the ranging system may include one or more second angle sensors to improve measurement accuracy of the angle data. For example, in certain embodiments, the measuring wheel may be equipped with a gyroscope configured to measure an angle direction of heading direction of the measuring wheel. In certain embodiments, the measuring wheel may be equipped with an electronic compass configured to measure an absolute direction of the measuring wheel. In certain embodiments, the measuring wheel may be equipped with a GPS, a Beidou navigation module, a Galileo system, a mobile communication module, an IoT module, etc. to determine the absolute position of the measuring wheel.

Figure 8:
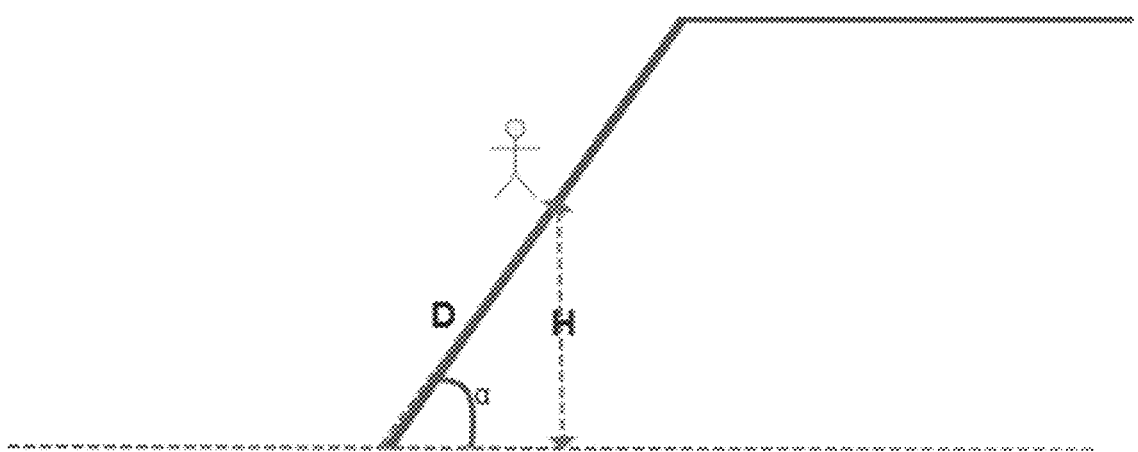
FIG. 8 is a diagram illustrating calculating a height H of a sampling point according to a tilt angle α and a traveled distance D.

In certain embodiments, the ranging system may be configured to further measure altitude or height information, and display the altitude or height information of one or more sampling points. In certain embodiments, the measuring wheel may be equipped with an altitude sensor. In certain embodiments, a gravity accelerometer configured in the measuring wheel device or in the terminal device may detect a tilt angle when the measuring wheel is pushed, so a height at a sampling point may be calculated according to the tilt angle and a traveled distance that has been traveled after the tilt angle changes. Referring to FIG. 8, the height H may be calculated according to the tilt angle $\alpha$ and the traveled distance D based on trigonometry calculation. The above calculation may be implemented by the data processing unit of the ranging system. In certain embodiments, the altitude or height information may be acquired by the terminal device using an augmented reality (AR) function available on certain smart devices. In certain embodiments, altitude or height information may be acquired by two or more methods describe above, and an average value may be calculated to improve measurement accuracy.

Figure 9:
FIG. 9 illustrates displaying a trajectory diagram based on ranging measurements over an electronic map.

Referring to FIG. 9, in certain embodiments, the ranging system may use an electronic map, a map screenshot or a real scene picture as a background, and measure and identify the actual positions on the background. The trajectory diagram (shown in the solid line) based on the measurement may be displayed over the background map or real scene photo.

Figure 10:
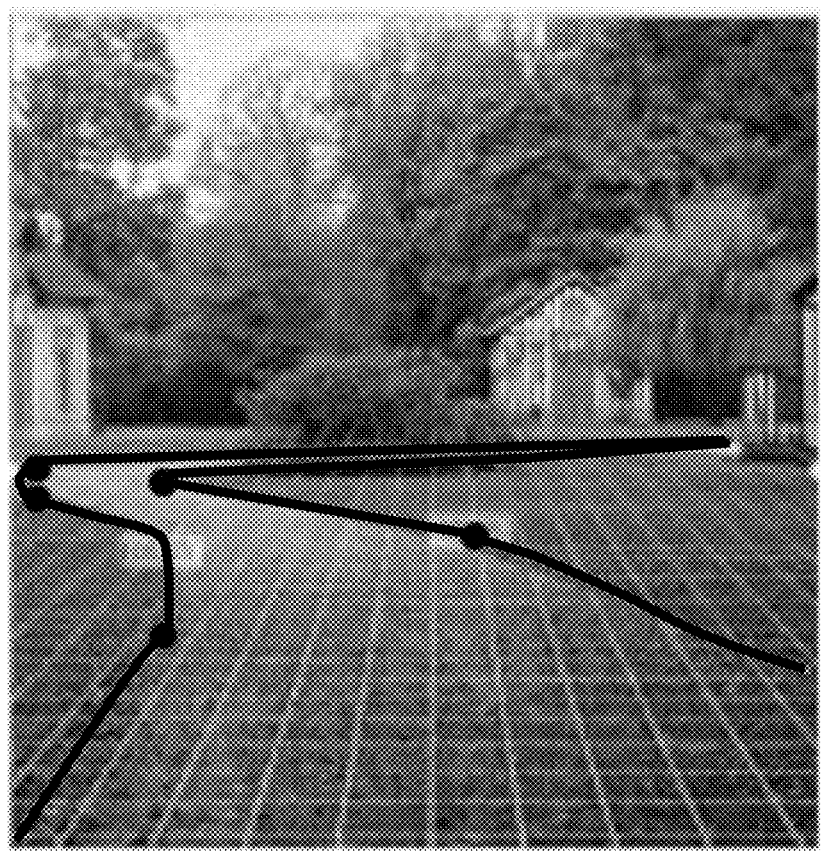

Referring to FIG. 10, in certain embodiments, the trajectory diagram (shown in the solid line) based on the measurement may be displayed over a real scene photo in a perspective view. Critical points (shown in block dots) of the trajectories may be displayed in the diagram. A user may interact with the display interface to adjust a position or a direction of one or more displayed trajectories, for example, by dragging one or more critical points to adjust their positions.

Figure 11:
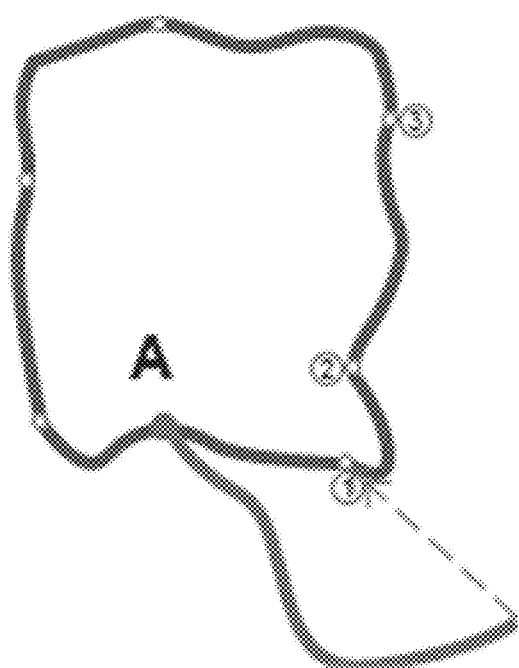
FIG. 11 illustrates a first trajectory diagram generated in a first ranging session and a progress of a second trajectory diagram generated in a second ranging session.

In certain embodiments, the ranging system may be configured to add an identifier to the trajectory diagram at a specific position encountered when generating the trajectory diagram. The identifier may be used to mark a current position that needs to be emphasized or needs follow-up work. In certain embodiments, the generated trajectory diagram and markings may be stored and retrieved later when a user resume the task or start a new task at the same cite. The user may accurately determine a position marked in the previous session based on the distance and angle data provided by the ranging system. Referring to FIG. 11, the closed trajectory is a first trajectory diagram generated by a first session with point A being a starting point. Three positions are marked by identifiers ①, ②, and ③ on the first trajectory diagram. When a second session continues, as long as the starting point A and the starting direction are determined, the ranging system may determine the relative positions of the marked points ①, ②, and ③ according to analysis of the distance and the direction data, and may prompt the user to return to a marked position.

In certain embodiments, the ranging system may be configured to allow a user to add a notation to the trajectory diagram. The notation may be in a form of text, or graphics, or a combination of the two.

In certain embodiments, an electrical generator may be configured on the ranging apparatus. For example, the electrical generator may be powered by mechanical rotations of the measuring wheel to generate electricity. The generated electricity may be used to power one or more electronic components of the ranging system.

In certain embodiments, a lighting component, such as a low-power LED light, may be configured on the measuring wheel. The lighting component may be turned on to improve visualization during operation in the dark.

The present disclosure further provides a ranging method based on the foregoing ranging system. The ranging method may include one or more operations in the foregoing description, and the specific details are not repeated.

Accordingly, the present disclosure provides a ranging system and a ranging method. The disclosed ranging system may perform ranging operation and simultaneously generate a traveling trajectory diagram in real time. A terminal device of the ranging system may perform optimization processing on the traveling trajectory to generate a high-quality, optimized trajectory diagram. The system may further mark an actual scene such with marking lines or marking points for a predetermined traveling trajectory on a predesigned drawing, and may prompt direction and distance information to a user. The ranging system may also be provided with a camera, and the terminal device may be configured to combine information recorded by the camera with the trajectory diagram to guide marking lines or points in the real scene, such as on a field or in a construction site. Route correction may also be incorporated in the marking process. In certain applications, the marked points and lines may be saved and used in a new ranging session. Compared to existing ranging devices, the ranging system and method in the present disclosure may coordinate the electronic counter and the angle sensor to generate a diagram of a traveling trajectory, in real time, on the terminal device by using the data measured by the ranging apparatus, and thus improving work efficiency in ranging and trajectory drafting applications.

The method and apparatus provided by the present disclosure according to the embodiments are described in detail above. The principles and implementation manners provided by the present disclosure are described herein by using specific examples. The description of the above embodiments is only used to help understand the method provided by the present disclosure. At the same time, a person skilled in the art will make changes the specific embodiments and the application scope according to the idea provided by the present disclosure. In summary, the contents of the present specification should not be construed as limiting the present disclosure.

What is claimed is:

1. A ranging system, comprising:
   a terminal device;
   a ranging apparatus, the ranging apparatus including a measuring wheel, a rotating shaft disposed on the measuring wheel, and an electronic counter connected to the rotating shaft and configured to obtain distance information, in real time, of a route which the measuring wheel has already traveled; and
   an angle sensor disposed in the terminal device or in the ranging apparatus, the angle sensor being configured to obtain angle information in real time;
   wherein:
   the terminal device and the ranging apparatus are configured to transmit data between each other; and
   the terminal device is configured to generate a traveling trajectory diagram of the measuring wheel, in real time, based on the distance information from the electronic counter and the angle information from the angle sensor, and perform optimization processing on the traveling trajectory to generate an optimized trajectory diagram,
   wherein the optimization processing on the traveling trajectory comprises:
   dividing a plurality of sampling points that form the traveling trajectory into a plurality of sampling point groups, each sampling point group including a pre-configured number of sampling points; and
   for each sampling point group, calculating a variance among the angle values of the pre-configured number of sampling points, and removing a stray value from the angle value of each sampling point in the sampling point group.

2. The ranging system according to claim 1, wherein the terminal device is further configured to compare a current traveling trajectory of the measuring wheel, in real time, with a predesigned traveling trajectory diagram stored on the terminal device, and output deviation data in response to the current traveling trajectory of the measuring wheel deviating from the predesigned traveling trajectory diagram.

3. The ranging system according to claim 2, wherein:
   the terminal device comprises a storage device configured to store the predesigned traveling trajectory diagram; and
   the terminal device is further configured to perform direction and/or distance prompt based on the deviation data to indicate a user to correct the current traveling trajectory of the measuring wheel.

4. The ranging system according to claim 1, wherein:
the ranging apparatus further comprises a marker configured to mark on the route of the measuring wheel according to a user instruction or according to a pre-configured rule.

5. The ranging system according to claim 1, wherein the angle sensor is an electronic compass disposed in the ranging apparatus and configured to communicate with the terminal device.

6. The ranging system according to claim 1, wherein the angle sensor is a gyroscope disposed in the terminal device.

7. The ranging system according to claim 1, wherein the ranging apparatus further comprises a holder for fixing the terminal device.

8. The ranging system according to claim 1, wherein:
the terminal device further comprises a camera configured to obtain, in real time, a scene image in a traveling direction of the measuring wheel; and
the terminal device is further configured to display the scene image and provide direction and/or distance prompt on the scene image.

9. The ranging system according to claim 1, wherein the terminal device and the ranging apparatus are configured to transmit data between each other through one of:
a wireless communication channel using a Bluetooth, a WIFI, a Zigbee or an RF communication protocol; or
a wired communication channel using an RS232, an RS485, an I2C, an SPI or a CAN protocol.

10. The ranging system according to claim 1, wherein:
the ranging system further comprises a cloud server communicating with the terminal device, the cloud server being configured to store and share data sent by the terminal device;
the data sent by the terminal device includes at least one of: the distance information from the electronic counter, the angle information from the angle sensor, and a first traveling trajectory diagram; and
the terminal device is configured to retrieve the predesigned traveling trajectory diagram from the cloud server.

11. The ranging system according to claim 1, wherein the terminal device is further configured to: in response to the traveling trajectory diagram containing a closed trajectory, calculate an area of the closed trajectory by meshing the closed trajectory and calculating the area of meshes contained by the closed trajectory.

12. The ranging system according to claim 11, wherein:
the ranging system further comprises a gravity accelerometer configured to measure a tilt angle; and
the terminal device is further configured to calculate a height at a sampling point according to the measured tilt angle and distance information.

13. The ranging system according to claim 1, wherein the terminal device is one of: a smart cellphone, a computer, or a handheld equipment.

14. The ranging system according to claim 1, wherein the terminal device is configured to:
generate the current trajectory diagram by connecting the plurality of sampling points, each sampling point being defined by a distance value and an angle value obtained from the electronic counter and the angle sensor; and
generate the optimized trajectory diagram by processing the plurality of sampling points.

15. The ranging system according to claim 14, wherein the optimization processing on the traveling trajectory performed by the terminal device further comprises:
analyzing a change in the angle values between a first sampling point and a second sampling point being adjacent to the first sampling point;
in response to the change in the angle values being below a pre-configured threshold angle, adjusting the angle value of the second sampling point to the angle value of the first sampling point; and
in response to the change in the angle values being within a pre-configured range about an integer multiples of 45°, adjusting the angle value of the second sampling point so that the change in the angle values is rounded to the integer multiples of 45°.

16. A ranging method, comprising:
obtaining, by an electronic counter, in real time, distance information which a measuring wheel of a ranging device has already traveled;
obtaining, by an angle sensor, in real time, angle information of the measuring wheel, when the measuring wheel is traveling;
transmitting the distance information and the angle information to a terminal device;
processing the distance information and the angle information into trajectory data by the terminal device;
generating, by the terminal device, in real time, a traveling trajectory diagram of the measuring wheel according to the trajectory data; and
performing optimization processing on the traveling trajectory to generate an optimized trajectory diagram, comprising:
dividing a plurality of sampling points that form the traveling trajectory into a plurality of sampling point groups, each sampling point group including a pre-configured number of sampling points; and
for each sampling point group, calculating a variance among the angle values of the pre-configured number of sampling points, and removing a stray value from the angle value of each sampling point in the sampling point group.

17. The ranging method according to claim 16, further comprising:
comparing a current traveling trajectory of the measuring wheel, in real time, with a predesigned traveling trajectory diagram stored on the terminal device; and
outputting deviation data in response to the current traveling trajectory of the measuring wheel deviating from the predesigned traveling trajectory diagram.

18. The ranging method according to claim 17, further comprising:
storing the predesigned traveling trajectory diagram in the terminal device; and
prompting direction and/or distance based on the deviation data to indicate the user to correct the current traveling route of the measuring wheel.

19. The ranging method according to claim 16, further comprising:
marking, by a maker disposed in the ranging device, on a traveling route of the measuring wheel according to a user instruction or according to a preconfigured rule.

20. The ranging method according to claim 16, wherein performing the optimization processing on the traveling trajectory further comprises:
analyzing a change in the angle values between a first sampling point and a second sampling point being adjacent to the first sampling point;

in response to the change in the angle values being below a pre-configured threshold angle, adjusting the angle value of the second sampling point to the angle value of the first sampling point; and in response to the change in the angle values being within a pre-configured range about an integer multiples of 45°, adjusting the angle value of the second sampling point so that the change in the angle values is rounded to the integer multiples of 45°.

\* \* \* \* \*